US006079860A

United States Patent [19]

Ito

[11] Patent Number: 6,079,860

[45] Date of Patent: Jun. 27, 2000

[54] VEHICULAR LIGHTING DEVICE HAVING A SHADE COMPONENT

[75] Inventor: Takaya Ito, Shizuoka, Japan

[73] Assignee: Koito Manufacturing Co., Ltd., Tokyo, Japan

[21] Appl. No.: 09/038,822

[22] Filed: Mar. 12, 1998

[30] Foreign Application Priority Data

Mar. 12, 1998 [JP] Japan .................................... 9-057582

[51] Int. Cl.[7] ........................................................ B60Q 1/00

[52] U.S. Cl. .......................... 362/509; 362/351; 362/303; 362/539

[58] Field of Search .................................... 362/298, 302, 362/303, 351, 361, 509, 512, 514, 515, 516, 539, 523

[56] References Cited

U.S. PATENT DOCUMENTS 1,327,563 1/1920 Lebby .................................... 362/298
1,487,780 3/1924 Hatcher .................................. 362/351
2,204,430 6/1940 Montague ............................... 362/351
4,816,974 3/1989 Gordin .................................... 362/261
4,947,303 8/1990 Gordin et al. .......................... 362/261
5,453,902 9/1995 Watanabe et al. ......................... 362/61
5,497,299 3/1996 Wisler et al. ............................. 362/61
5,879,073 3/1999 Hori et al. .............................. 362/344

*Primary Examiner*—Sandra O'Shea
*Assistant Examiner*—John A. Ward

[57] ABSTRACT

A vehicular lighting device includes a reflector having a reflecting surface; a light source, supported in the reflector; a lens disposed in front of the reflector and the light source; a shade device, including a shade portion, a support portion, and an end part portion, for interrupting the rays of light emitted from the light source, wherein the shade device is fixedly supported to the reflecting surface of the reflector at the end part portion; and a covering member for covering the end part portion of the shade device.

19 Claims, 9 Drawing Sheets

VEHICULAR LIGHTING DEVICE HAVING A SHADE COMPONENT

This application claims the benefit of Japanese Patent Application No. Hei. 9-57582, filed on Mar. 12, 1997, which is hereby incorporated by reference

FIELD OF THE INVENTION

The present invention relates to a vehicular lighting device, and more particularly, to a vehicular lighting device having a shade for interrupting the rays of light emitted forward from a light source.

DISCUSSION OF THE RELATED ART

Vehicular lighting devices, an example of which is a headlight, may be provided with a shade for interrupting a light beam emitted from a light source that is directly projected through a lens in a forward direction. FIG. 9 is a perspective view showing an example of such a vehicular lighting device. As shown in FIG. 9, a bulb socket 81 is mounted in the opening of the rear wall of a reflector 21. This reflector 21 is formed by coating the inner surface of the body of the lighting device with aluminum by a suitable method. A bulb 8 is fastened to the bulb socket 81. A shade 9B, which is shaped like a cap, is disposed so that it covers the front side of the bulb 8. The shade 9B is fixedly supported by a boss member 24. The shade 9B includes a shading portion 91B for covering the front side of the bulb 8 and a support portion 92 protruding rearwardly from a lower part of the circumferential edge of the shading portion 91B. The end part 93 of the support portion 92 is fastened to the boss member 24 by means of a screw 96.

In order to fix the shade 9B to the reflector 21, the screw 96 is applied to the boss member 24 from the front of the reflector 21. When arranged in this fashion, the head of the screw 96 is visible through the lens of the lighting device. The exposed screw deteriorates the smoothness of the external appearance of the lighting device. This problem of the exposed screw head is even more apparent in recent vehicular lighting device designs which frequently use a plain, clear lens not having steps for refraction or diffusion purposes. One possible solution to the screw head problem is to caulk the end part 93 of the shade 9B onto the reflector 21. However, this approach fails to solve the problem because the reflector is often made of resin, and it is almost impossible to find a resin reflector having a satisfactory caulking strength.

Another possible solution to the exposed screw head problem is to insert the support end part 93 of the shade 9B into a through-hole groove formed in the reflector 21 and to fasten the shade to the reflector on the rear side of the reflector. This approach is not recommended, however, because the presence of the through-hole groove impairs the water-proof capability of the resultant lighting device. Any measures to avoid this problem results in an increase in the number of necessary component parts and the complexity of the structure.

SUMMARY OF THE INVENTION

Accordingly, the present invention is directed to a vehicular lighting device that substantially obviates one or more of the problems due to limitations and disadvantages of the related art.

An object of the present invention is a vehicular lighting device having an external appearance that is not marred by an exposed fixing means, e.g., a screw, for fixing the shade.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the vehicular lighting device includes a reflector having a reflecting surface; a light source, supported by the reflector; a lens disposed in front of the reflector and the light source; a shade device, including a shade portion, a support portion, and an end part portion, for interrupting the rays of light emitted from the light source, wherein the shade device is fixedly supported to the reflecting surface of the reflector at the end part portion; and a covering member for covering the end part portion of the shade device.

In another aspect of the present invention, the vehicular lighting device includes a reflector having a reflecting surface, an opening, and a boss member protruding forward from the reflector; a light source, supported in the opening of the reflector; a lens disposed in front of the reflector and the light source; a shade device, including a shade portion, a support portion, and an end part portion, for interrupting the rays of light emitted from the light source, wherein the shade device is fixedly supported to the boss member of the reflector at the end part portion by an attaching device; and a covering member fastened to the boss member for covering the end part portion of the shade device, the attaching device and the boss member of the reflector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5(*b*) is a cross sectional view of the lighting device taken along the line Vb—Vb in FIG. 5(*a*).

FIG. 7(*b*) is a front view of the vehicular lighting device arrangement of FIG. 7(*a*);

FIG. 8(*b*) is a cross sectional view showing another modification of the covering member.

DETAILED DESCRIPTION OF THE PREFERRED EMBODIMENTS

Reference will now be made in detail to the preferred embodiments of the present invention, examples of which are illustrated in the accompanying drawings.

Figure 1:
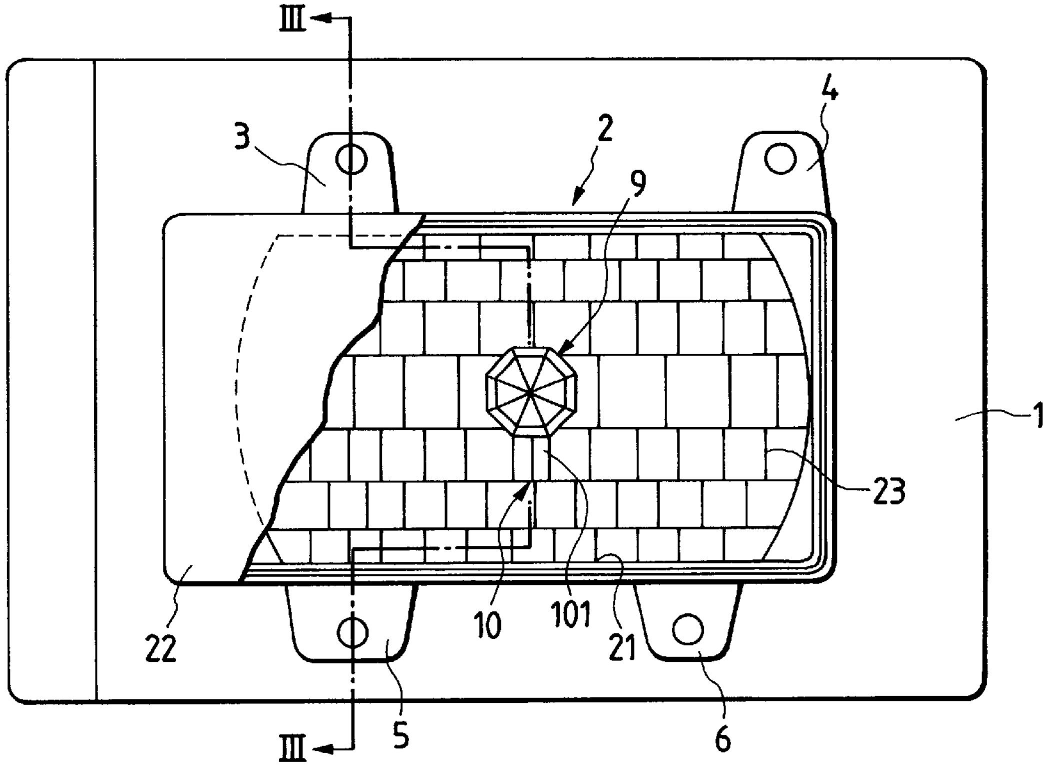
FIG. 1 is a front view showing a vehicular lighting device of a first preferred embodiment of the present invention.
Figure 2:
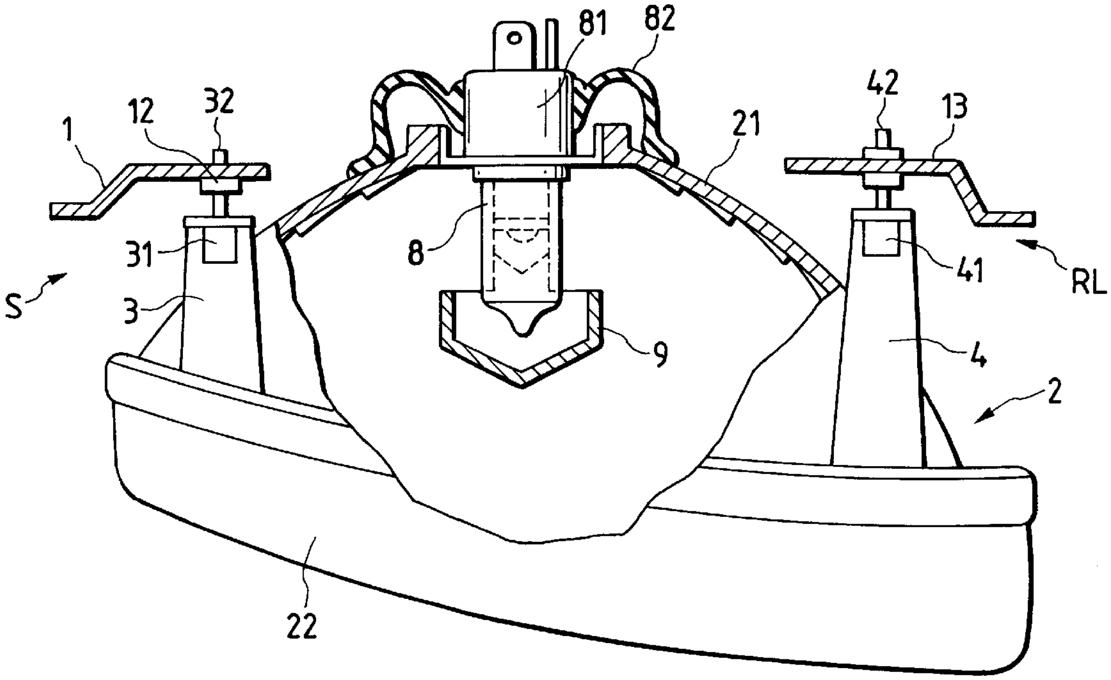
FIG. 2 is a plan view showing a part of the lighting device which is illustrated in FIG. 1.
Figure 3:
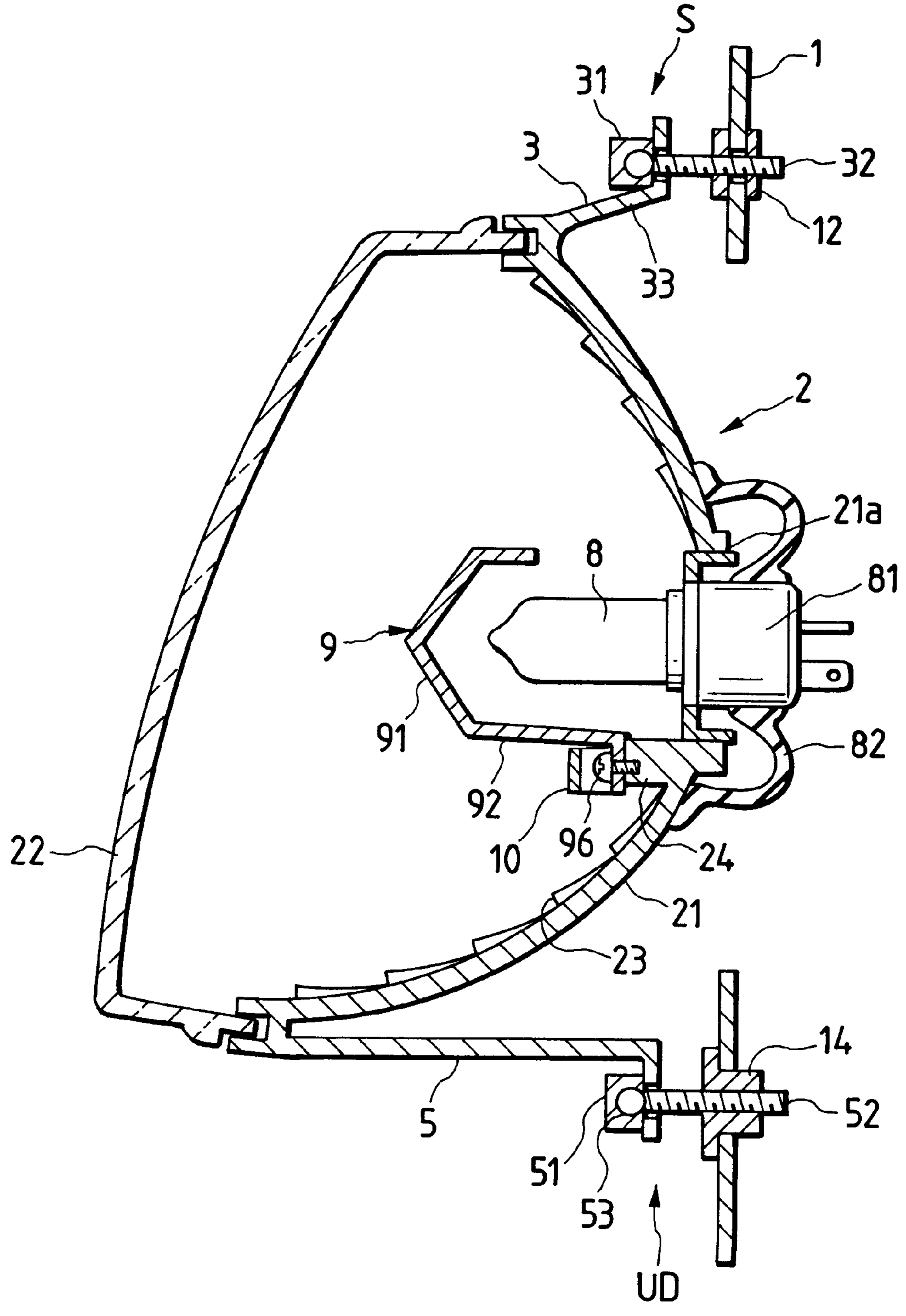
FIG. 3 is a cross sectional view taken along the line III—III in FIG. 1.
Figure 4:
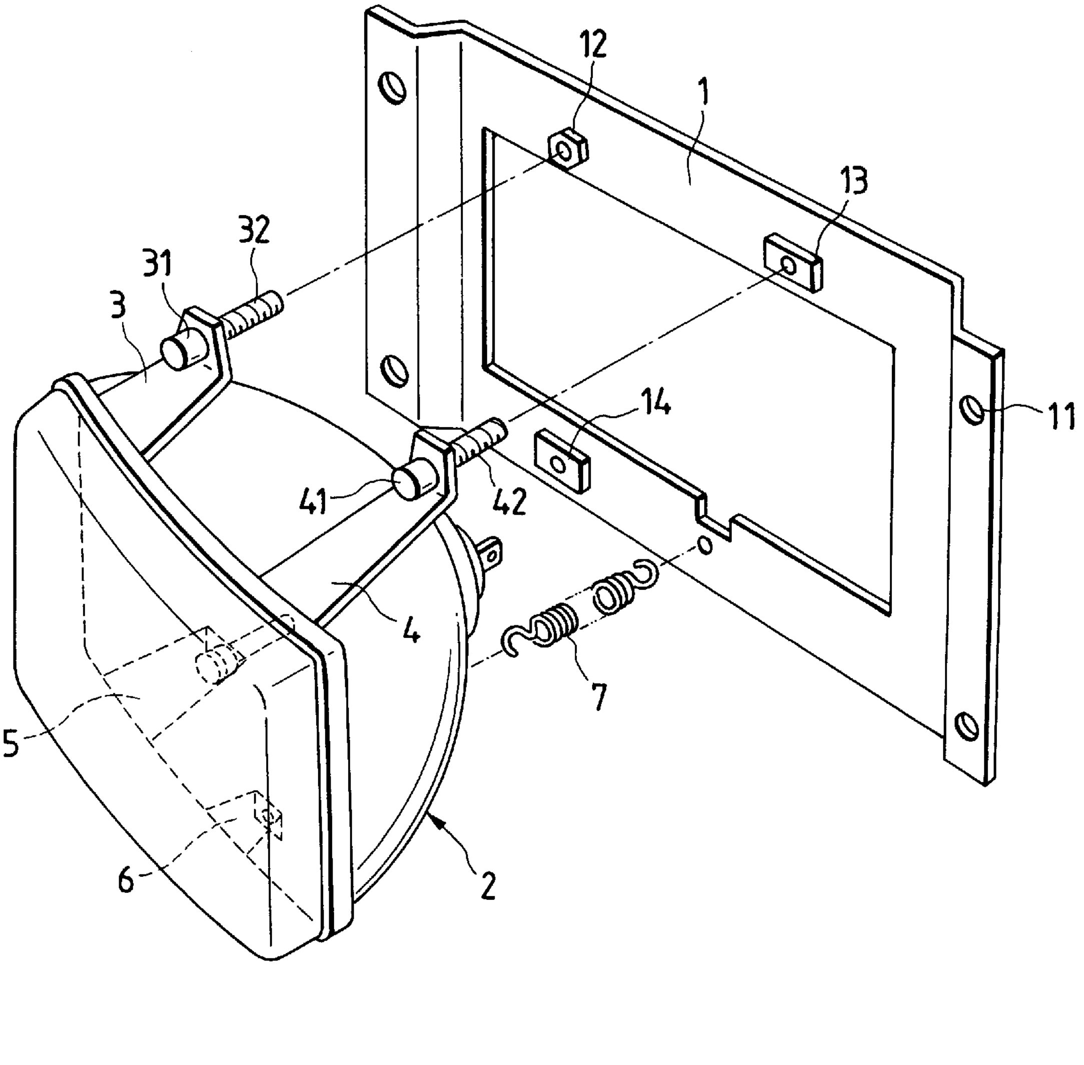
FIG. 4 is an exploded perspective view of the overall construction of the lighting device of FIG. 1.

FIG. 1 is a front view showing a vehicular headlamp of a first preferred embodiment of the present invention. FIG. 2 is a plan view showing a part of the vehicular headlamp of FIG. 1. FIG. 3 is a cross sectional view taken along the line III—III in FIG. 1. FIG. 4 is an exploded perspective view of the overall construction of the vehicular headlamp of FIG. 1. As shown in at least these figures, the vehicular headlamp includes a mount ring 1, which is substantially rectangular in shape, and a lamp unit 2, which is supported by and within the mount ring 1. The lamp unit 2 may be tilted back and forth as well as to the right and left with respect to the mount ring 1, thereby adjusting a light distribution pattern of the lamp.

First and second protruding members 3 and 4 protrude in a rearward direction from the rear side of the lamp unit 2 at two respective positions that are located near the upper part of the rear side of the lamp unit 2. These first and second protruding members 3 and 4 are both formed integrally with the lamp unit 2. Third and fourth protruding members 5 and 6 also protrude in a rearward direction from the rear side of the lamp unit 2 at two respective positions located near the lower part of the rear side of the lamp unit 2. These third and fourth protruding members 5 and 6 are also integrally formed with the lamp unit 2. Three of the protruding members 3, 4 and 5 are utilized when the lamp unit 2 is fixedly supported by the mount ring 1.

A support mechanism (to be described later) is assembled among these protruding members 3, 4 and 5 and the mount ring 1. The support mechanism is an aiming mechanism for tilting the lamp unit 2 in rearward and forward directions as well as in right and left directions with respect to the mount ring 1. The mount ring I is mounted on a vehicle body (not shown) by utilization of a plurality of holes 11. An extension spring 7, as shown at least in FIG. 4, is disposed between the mount ring I and the fourth protruded member 6 located on the lower portion of the lamp unit 2. The extension spring 7 resiliently urges the lamp unit 2 towards the mount ring 1.

As shown at least in FIG. 3, a ball bearing 31 is mounted on the first protruding member 3. A screw rod 32 is coupled with the mount ring I with the aid of a nut 12. A ball 33 is attached to the tip of the screw rod 32. The ball 33 of the screw rod 32 is fit into the ball bearing 31. In this structural example, the ball bearing 31 of the first protruding member 3 serves as a fulcrum or support point S. The lamp unit 2 is tilted about the support point S back and forth as well as to the right and left.

The third protruding member 5 is provided with an upward/downward aiming mechanism UD for tilting the lamp unit 2 up and down by displacing the third protruding member back and forth. As shown at least in FIG. 3, a ball bearing S1 is mounted on the third protruding member 5. A level or upward/downward aiming screw 52 is supported by the mount ring 1 while being movable axially, for example. This upward/downward level aiming screw 52 is threadedly supported by a nut 14 fastened to the mount ring 1. A ball 53 is attached to the tip of the level aiming screw 52. The ball 53 of the upward/downward level aiming screw 52 is fit into the ball bearing 51.

The third protruding member 5 is moved towards or away from the mount ring 1 in accordance with the direction in which the upward/downward aiming screw 52 is turned. Through the movement of the third protruding member 5, the lamp unit 2 is tilted about the support point S.

As shown at least in FIG. 2, the second protruding member 4 is associated with a right/left aiming mechanism RL which includes a ball bearing 41, a horizontal aiming screw 42 and a nut 13 of the mount ring 1. The lamp unit 2 is tilted about the support point S to the right and left by moving the second protruding member 4 towards and away from the mount ring 1.

The lamp unit 2 includes a lamp body, shaped like a capsule, and a lens 22. The inner surface of the lamp body is coated with aluminum by any appropriate method, to form a reflector 21 with a mirror surface. The lens 22 and the reflector 21 define a lamp chamber within the lamp body. A number of steps 23 are formed on the surface of the reflector 21 in both vertical and horizontal arrays. The surface of the reflector 21 is segmented into a number of small reflecting surfaces or areas by the steps 23. The lens 22 is preferably made of transparent resin. When the lamp unit 2 is viewed from the front side, the viewer feels a depth in the reflecting surface because of the unevenness in its appearance caused by its steps 23.

As seen at least in FIG. 3, an opening **21*a* for supporting a light source 8, such as a light bulb for example, is formed in the rear wall opening of the reflector 21. A boss member 24 for fixedly supporting a shade 9 (to be described later) is located right under the opening 21 a This boss member is arranged so that it protrudes forward from the reflector 21. A light source socket 81 is secured within the opening 21*a* of the reflector 21 and it is sealed with a sealing cap 82**.

Figure 5A:
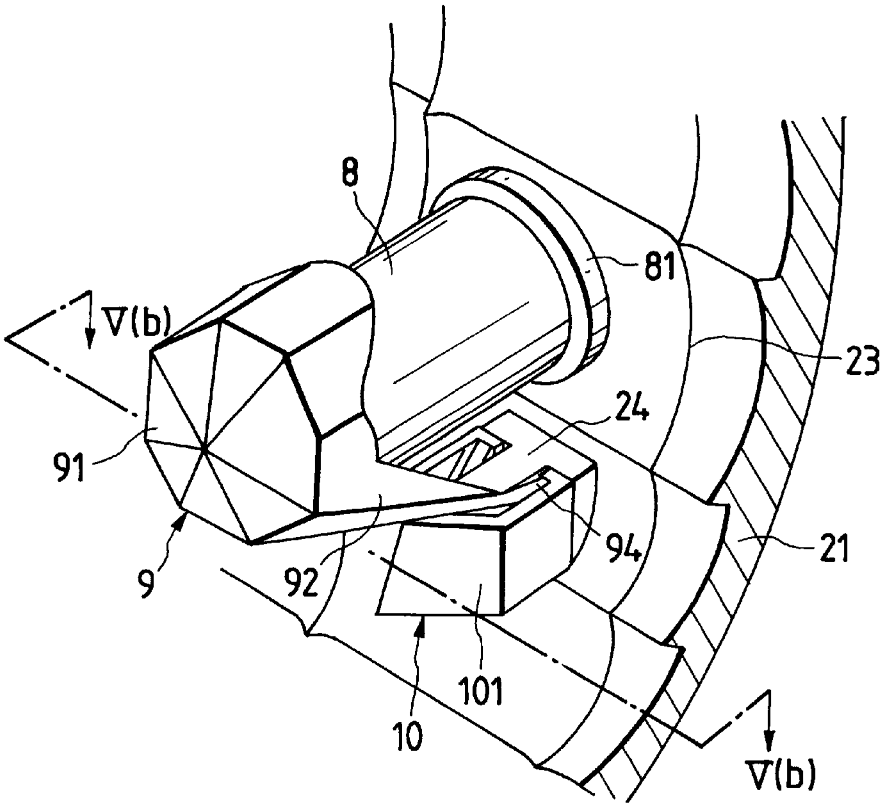
FIG. 5(*a*) is a perspective view showing the lighting device to which a shade and a covering member are attached.
Figure 5B:
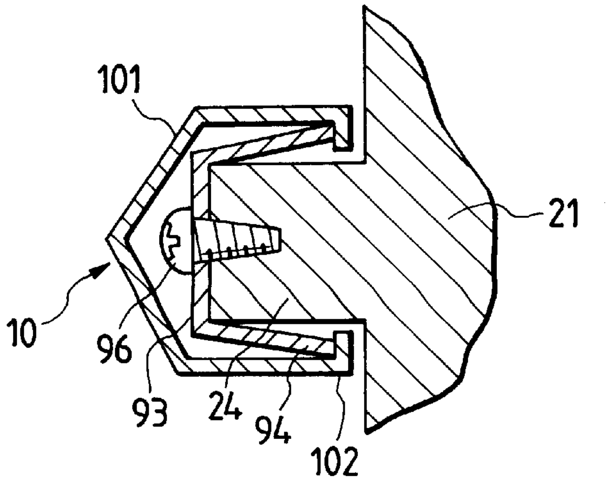
Figure 6:
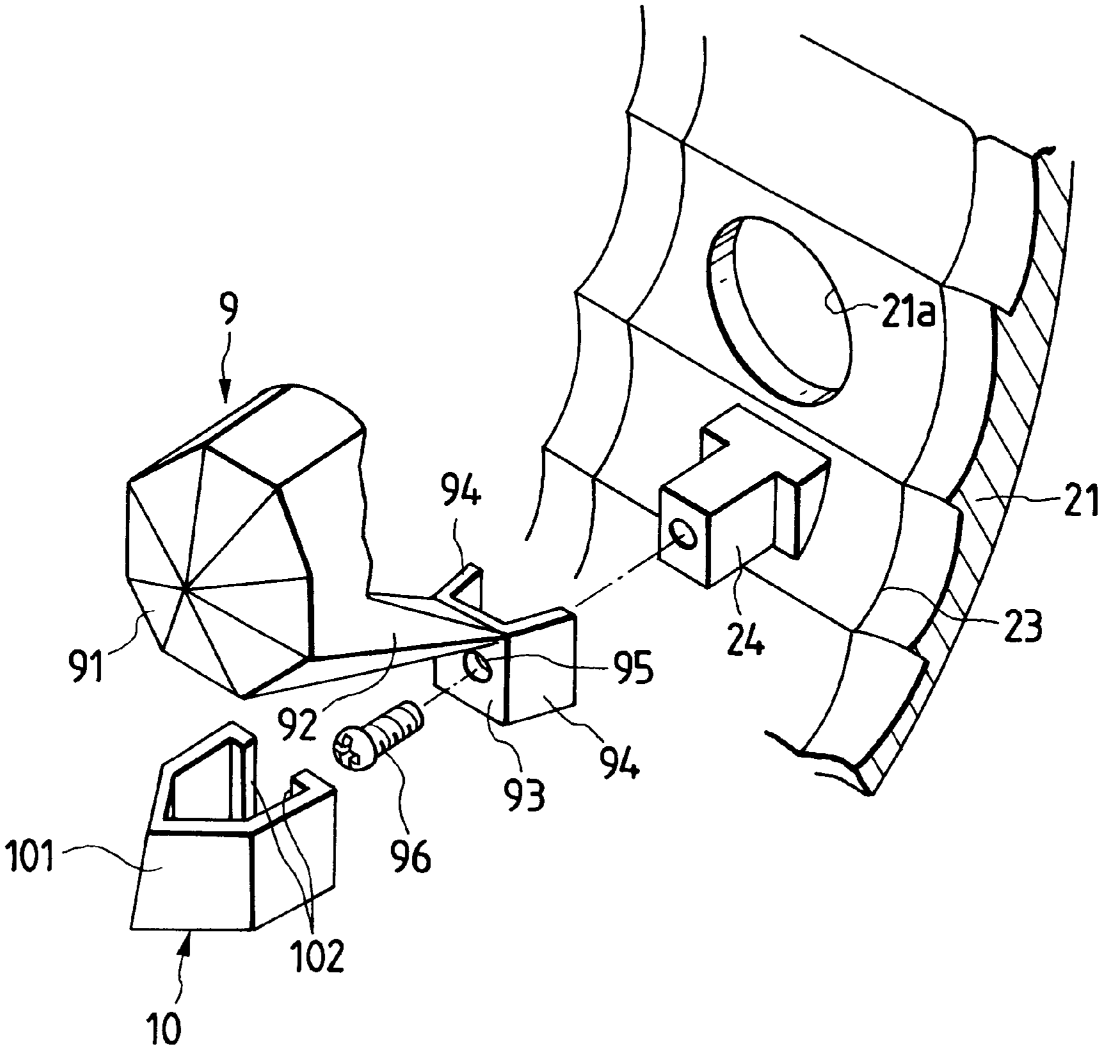
FIG. 6 is an exploded view showing the assembly of the shade and the covering member of FIG. 5 in accordance with the first preferred embodiment of the present invention.

The shade 9 is provided in association with the light source 8 to regulate the direction of the rays of light emitted from the light source. An example of a particular construction of the shade 9 is illustrated in a perspective view in FIG. 5(*a*), in a cross sectional view in FIG. 5(*b*), and in an exploded view in FIG. 6.

The shade 9 includes a shade portion 91, a support portion 92, and an end part portion 93. The shade portion 91 is shaped like a polygonal umbrella. The preferred embodiment shown is in an octagonal umbrella shape. The shade 9 is formed by bending a heat-resistive metal plate. The shade is placed in front of the light source 8. The support section 92 in combination with the end part portion 93 protrudes from a lower part of the peripheral edge of the shade portion 91 and is shaped like an inverted L in its vertical cross section. The support section 92 in combination with the end part portion 93 is long enough to reach the boss member 24, which is located under the light source 8. The end part portion 93 also has a couple of wing pieces 94 at its tip. The wing pieces 94 are extended to the rear side of the vehicular lighting device. In a preferred embodiment, a space between the wing pieces 94 progressively increases toward the rear side of the lamp unit 2. The surface of the shade 9 is preferably coated with aluminum, which serves as a mirror surface like the reflecting surface of the reflector 21. The shade 9 is fastened to the boss member 24 by means of a screw 96 through a small hole 95, which is bored in the end part 93 of the support section 92.

A covering member 10 is provided which covers the end part portion 93 and the wing pieces 94 of the shade 9. The covering member 10 is formed by bending a rectangular plate into, for example, an octagonal shape having one side opened. The covering member 10 has a front surface 101 which is bent at the center to form a triangle (when viewed from above or below) being directed in a forward direction. The covering member 10 consists of two rectangular, slanted segmental surfaces and has engaging parts 102 defining its opened rear side. The surface of the covering member 10 is coated with aluminum to serve as a mirror surface like the reflector 21 and the shade 9. The covering member 10 is fastened to the boss member 24 to which the end part 93 of the shade 9 is fastened by means of the screw 96. To fasten the covering member 10 to the boss 24, the covering member 10 is applied to the boss member 24 from the front, and the engaging parts 102 of the covering member 10 are engaged with both side edges of the wing pieces 94 of the end part 93 of the shade 9. When fastened to the boss member 24, the covering member 10 covers the end part 93 of the shade 9, the screw 96, and the boss member 24. In this case, the covering member 10 is pushed against the boss member 24 in the backward direction. Then, the engaging parts 102 of the covering member 10 are elastically expanded outward and advance over the wing pieces 94, and resume their original form by their resiliency and finally come into engagement with the wing pieces 94.

A vehicular lighting device constructed in accordance with the preceding description produces a desired light distribution pattern by tilting the lamp unit 2 to the right and left, and upward and downward with respect to the mount ring I through the functionality of the right/left aiming mechanism RL and the upward/downward aiming mechanism UD. It is noted that in the lamp unit 2, the shade 9 is fastened at its end part 93 to the boss member 24 of the reflector 21 by means of the screw 96. Moreover,. the covering member 10 is applied to the end part 93, to cover the screw 96 and thus shield the screw from possible view through the lens 22.

The front surface 101 of the covering member 10, which consists of two rectangular, slanted segmental surfaces is preferably rectangular when viewed from the front side. Its shape resembles the shape of the small rectangular areas defined by the steps 23 on the reflecting surface of the reflector 21. As a result, a viewer of the lighting device cannot clearly distinguish the ridges of the front surface 101 of the covering member 10 from the steps 23 of the reflector 21. This results in the shade 9, the covering member 10 and the reflecting surface of the reflector 21 all looking uniform to a viewer. The covering member 10 neither stands out against the surface of the reflector 21 nor deteriorates the overall uniformity and look of the headlamp. As a result, there is no need of forming through-holes in the reflector 21 for attaching the shade 9 to the reflector 21, and thus there is no deterioration of the water-proof nature of the lighting device.

Figure 7A:
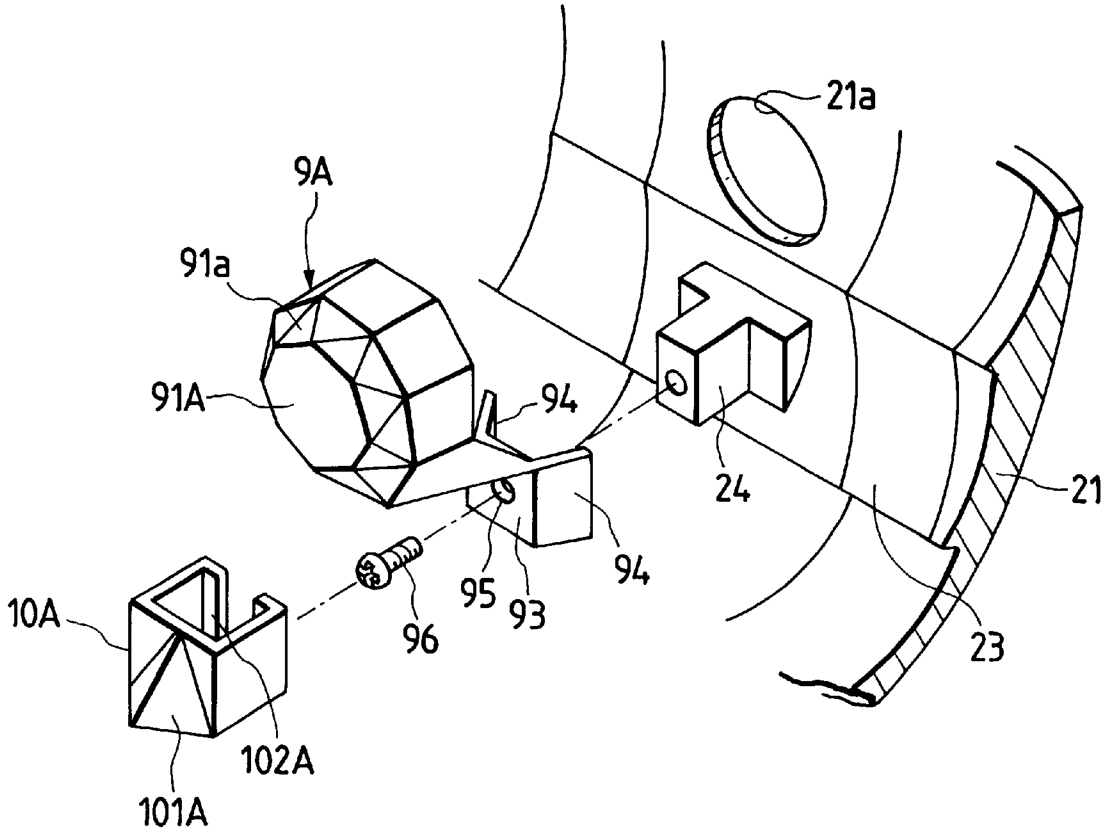
FIG. 7(*a*) is a perspective view showing the assembly of the shade and the covering member in accordance with a second preferred embodiment of the present invention.
Figure 7B:
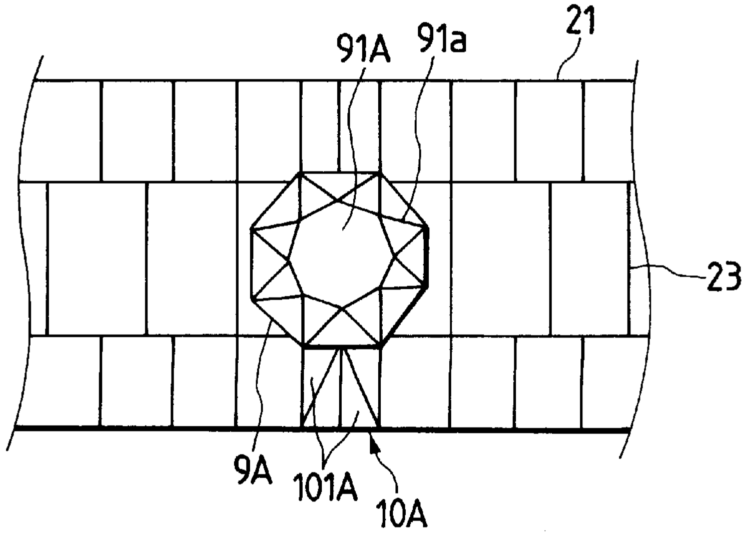

FIG. 7(*a*) is a perspective view showing the assembly of the shade and the covering member in accordance with a second preferred embodiment of the present invention. FIG. 7(*b*) is a frontal view of the vehicular lighting device arrangement of FIG. 7(*a*). Corresponding and equivalent portions are designated by like reference numerals as used in reference to the FIGS. illustrating the aforementioned embodiment. In the embodiment of FIGS. 7(*a*) and 7(*b*), a plural number of triangular segmental faces 91*a* are circumferentially arranged on the front surface of the shade 9A, to present a diamond-type appearance. A covering member 10A is preferably shaped like a square when viewed from above or from below. One side of the square covering member 10A has an opening which is defined by engaging parts 102A. The surface of the side of the square covering member 10A that is opposed to the opened side and directed towards the frontal direction consists of four triangular segmental surfaces 101A, each having a vertex angle nearly equal to that of each of the triangular segmental faces 91*a*. Also, a triangular prism is formed that contains the vertical central line of the surface slanted towards the frontal direction.

The shade 9A is fastened to the boss member 24 of the reflector 21 by means of the screw 96, and the square covering member 10A is mounted in a way which covers the screw 96 and in a way that ensures that the screw 96 is kept from sight. This arrangement provides an aesthetically pleasing, uniform view of the vehicular lighting device. In this embodiment, the triangular segmental faces 91*a* of the shade 9A and the triangular segmental surfaces 101A of the covering member 10A are designed to provide this uniform appearance. The shade 9A and the covering member 10A are designed so that the configurations of the triangular segmental faces 91*a* and the triangular segmental surfaces 101A result in an overall uniform vehicular lighting device appearance when placed in front of the rectangular configurations of the steps 23 on the reflector 21.

Figure 8A:
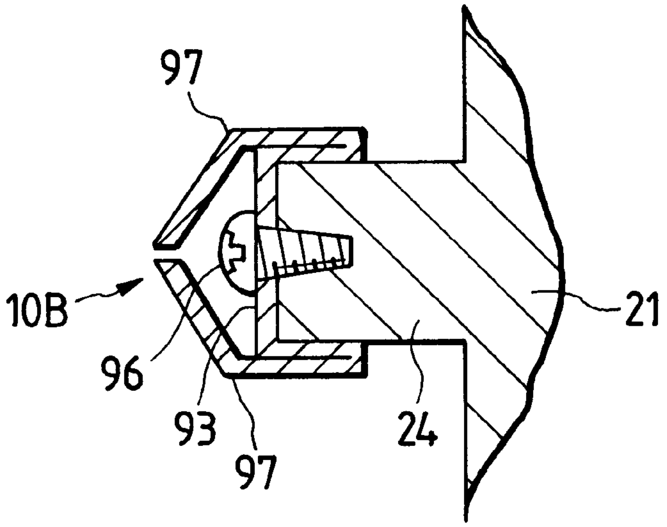
FIG. 8(*a*) is a cross sectional view showing a modification of the covering member.

In the embodiments mentioned above, the covering member is separated from the shade. These components may be constructed in one-piece construction, if required. An example of this one-piece construction is shown in FIG. 8(*a*). As shown, the end part 93 of the support section of the shade has a couple of elongated pieces 97 which extend from both sides of the end part 93. This end part 93, which includes the elongated pieces 97, is fastened to the boss member 24 by means of the screw 96. Then, the elongated pieces 97 are bent so that their tips are facing each other. As a result, the screw 96 is hidden by the elongated pieces 97 bent in this fashion. Accordingly, the elongated pieces 97, when thus bent, serve as a covering member 10B.

Figure 8B:
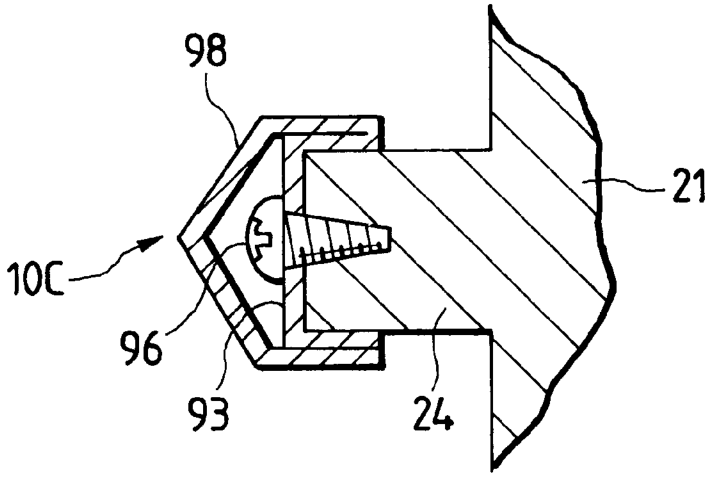
Figure 9:
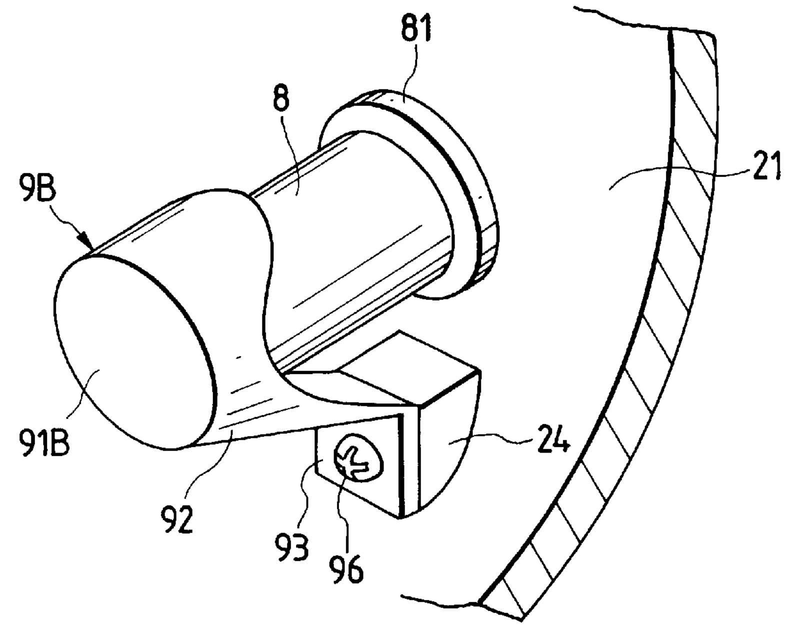
FIG. 9 PRIOR ART
FIG. 9 is perspective view showing a portion of a conventional lighting device equipped with a shade.

Another example of the one-piece construction is shown in FIG. 8(*b*). A straight, elongated piece 98, which is longer than each elongated piece 97, is extended from one side of the end part 93 in one direction. This elongated piece 98 is bent as shown and the extreme end of the elongated piece 98 is connected to the other side of the end part 93, whereby a covering member 10C is formed. The screw 96 is hidden by this elongated picce 98. The FIG. 8(*b*) construction provides an improved aesthetic view than the FIG. 8(*a*) construction because the FIG. 8(b) arrangement has no gap in its covering member 10C, while the FIG. 8(*a*) arrangement has a gap between the tips between the bent elongated pieces 97 of the covering member 10B. As a result, the FIG. 8(*b*) arrangement is capable of completely keeping the screw 96 from sight.

In each of the embodiments described above, the present invention is applied to a vehicular lighting device of a relatively simple structure, but it may be applied to a complex type lighting device having, for example, a clearance lamp incorporated there into, as well as other types of lighting devices having shades. The lens used may be a lens having diffusion steps formed thereon or a plain lens without diffusion steps and having a clear, transparent surface.

In a vehicular lighting device, a light source, such as a bulb, is supported by a reflector. The surface of the reflector is provided to have a reflecting surface, such as that of a mirror. A shade is provided for interrupting the rays of light emitted from the bulb. The shade is fixedly supported by means of a screw in the reflecting surface of the reflector. A covering member is provided for covering the screw, to thereby keep the screw from sight. The covering member thus ensures an aesthetically pleasing and uniform external appearance for the vehicular lighting device. The front surface of the covering member may be configured to resemble the small segmental areas of the reflector reflecting surface, which is defined by a number of steps. Alternatively, the front surface of the covering member may be configured to resemble the segmental surfaces of the shade. The front surface of the covering member is designed to appear uniform with the reflector surface and/or the shade surface, providing a consistent and pleasing appearance to the lighting device.

It will be apparent to those skilled in the art that various modifications and variations can be made in the vehicular lighting device of the present invention without departing from the spirit or scope of the invention. Thus, it is intended that the present invention cover the modifications and variations of this invention provided they come within the scope of the appended claims and their equivalents.

What is claimed is:

1. A vehicular lighting device comprising:

a reflector having a reflecting surface;

a light source supported in said reflector;

a lens disposed in front of said reflector and said light source;

a shade device, including a shade portion, a support portion, and an end part portion, for interrupting the rays of light emitted from said light source, wherein said shade device is fixedly supported to the reflecting surface of said reflector at said end part portion by a fastener; and a covering member engaged with the end part portion of said shade device and configured to cover at least said fastener.

2. The vehicular lighting device according to claim 1, wherein said shade device and said covering member have mirror surfaces.

3. The vehicular lighting device according to claim 1, wherein the reflecting surface of said reflector is segmented into small segmental areas, and said covering member has a surface configuration including a combination of segmental surfaces resembling said small segmental areas of the reflecting surface of said reflector.

4. The vehicular lighting device according to claim 3, wherein the surface of said shade device includes a plurality of segmental surfaces resembling said segmental surfaces of said covering member.

5. The vehicular lighting device according to claim 1, wherein said lens is a plain lens having a clear, transparent surface.

6. The vehicular lighting device according to claim 1, wherein said light source is a light bulb.

7. The vehicular lighting device according to claim 2, wherein said mirror surfaces of said shade device and said covering means are coated with aluminum.

8. The vehicular lighting device according to claim 1, wherein the shade portion of the shade device is shaped as a polygonal umbrella.

9. The vehicular lighting device according to claim 8, wherein the polygonal umbrella is of an octagonal shape.

10. A vehicular lighting device comprising:

a reflector having a reflecting surface, an opening, and a boss member protruding forward from the reflector;

a light source, supported in said opening of said reflector;

a lens disposed in front of said reflector and said light source;

a shade device, including a shade portion, a support portion, and an end part portion, for interrupting the rays of light emitted from said light source, wherein said shade device is fixedly supported to the boss member of the reflector at said end part portion by an attaching device; and a covering member fastened to the boss member for covering the end part portion of said shade device, the attaching device and the boss member of the reflector.

11. The vehicular lighting device according to claim 10, wherein said attaching device is a screw.

12. The vehicular lighting device according to claim 11, wherein said shade device and said covering member have mirror surfaces.

13. The vehicular lighting device according to claim 10, wherein the reflecting surface of said reflector is segmented into small segmental areas, and said covering member has a surface configuration including a combination of segmental surfaces resembling said small segmental areas of the reflecting surface of said reflector.

14. The vehicular lighting device according to claim 13, wherein said shade device has a surface configuration including a plurality of segmental surfaces resembling said segmental surfaces of said covering member.

15. The vehicular lighting device according to claim 10, wherein said lens is a plain lens having a clear, transparent surface.

16. The vehicular lighting device according to claim 10, wherein said light source is a light bulb.

17. The vehicular lighting device according to claim 12, wherein said mirror surfaces of said shade device and said covering member are coated with aluminum.

18. The vehicular lighting device according to claim 10, wherein the shade portion of the shade device is shaped as a polygonal umbrella.

19. The vehicular lighting device according to claim 18, wherein the polygonal umbrella is of an octagonal shape.

* * * * *

UNITED STATES PATENT AND TRADEMARK OFFICE

CERTIFICATE OF CORRECTION

PATENT NO. : 6,079,860
DATED : June 27, 2000
INVENTOR(S) : ITO

It is certified that error appears in the above-identified patent and that said Letters Patent is hereby corrected as shown below:

On the title page:

In Item [30] Foreign Application Priority Data:

change "Mar. 12, 1998" to --Mar. 12, 1997--.

Signed and Sealed this

Eighth Day of May, 2001

Attest:

NICHOLAS P. GODICI

*Attesting Officer* *Acting Director of the United States Patent and Trademark Office*